United States Patent
Manabe

(10) Patent No.: US 7,209,601 B2
(45) Date of Patent: Apr. 24, 2007

(54) CMOS IMAGE SENSOR USING HIGH FRAME RATE WITH FRAME ADDITION AND MOVEMENT COMPENSATION

(75) Inventor: Sohei Manabe, San Jose, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 755 days.

(21) Appl. No.: 10/625,707

(22) Filed: Jul. 22, 2003

(65) Prior Publication Data

US 2005/0018927 A1    Jan. 27, 2005

(51) Int. Cl.
G06K 9/32    (2006.01)
G06K 9/36    (2006.01)
H04N 3/14    (2006.01)

(52) U.S. Cl. .................. 382/294; 382/284; 348/294

(58) Field of Classification Search ............... 382/284, 382/312, 294, 305; 345/629, 648; 235/435; 348/294, 298; 257/292; 438/60
See application file for complete search history.

(56) References Cited

U.S. PATENT DOCUMENTS 4,998,132 A * 3/1991 Kurogane et al. ............ 355/40
5,657,402 A   8/1997 Bender et al.
6,205,259 B1  3/2001 Komiya et al.
6,362,850 B1 * 3/2002 Alsing et al. ............... 348/239
6,589,176 B2 * 7/2003 Jago et al. ................... 600/443
7,092,019 B1 * 8/2006 Ogata et al. ................. 348/263
2003/0090593 A1 5/2003 Xiong
2003/0098919 A1 5/2003 Liu et al.

FOREIGN PATENT DOCUMENTS

EP      0 940 978      9/1999
WO      WO 02 25929    3/2002

OTHER PUBLICATIONS

European Search Report on European Patent Application EP 04 25 2906, transmitted Mar. 3, 2006, 3 pages.

* cited by examiner

Primary Examiner—Kanjibhai Patel

(57) ABSTRACT

A method of forming a composite image using a CMOS image sensor. The method comprises capturing a plurality of frames using the image sensor, identifying a reference point in each of the frames, and aligning the frames using the reference point. Finally, the frames are combines, such as be an arithmetic addition, into the composite image.

5 Claims, 4 Drawing Sheets

CMOS IMAGE SENSOR USING HIGH FRAME RATE WITH FRAME ADDITION AND MOVEMENT COMPENSATION

TECHNICAL FIELD OF THE INVENTION

The present invention relates generally to CMOS image sensors, and more particularly, to a method and apparatus for increasing the dynamic range and/or movement stability of the image sensor.

BACKGROUND OF THE INVENTION

Integrated circuit technology has revolutionized various fields including computers, control systems, telecommunications, and imaging. For example, in the imaging field, CMOS image sensors have proved to be less expensive to manufacture relative to CCD imaging devices. Further, for certain applications, CMOS devices are superior in performance. For example, the signal processing logic necessary can be integrated alongside the imaging circuitry, thus allowing for a single integrated chip to form a complete stand-alone imaging device. CMOS image sensors are now available from a variety of manufacturers, including the assignee of the present invention, OmniVision Technologies, Inc.

The primary building block of an image formed by a CMOS image sensor is a pixel. The number, size and spacing of the pixels determine the resolution of the image generated by the imaging device. The pixels of a CMOS image sensor are semiconductor devices that transform incident light photons into current signals. The signal produced by each pixel is generally extremely small, but is related to the amount of incident light photons.

Optimally, the image sensor must operate in a myriad of light and movement conditions. The image sensor when used in a mobile phone application may be required to record images in low light conditions, since a flash is not readily available. In such a situation, the exposure time of the image sensor must be increased, much like for a conventional camera using photographic film. However, the increase in exposure time will give rise to blurring of the image if the sensor is moved or shaken.

Further, in other applications, such as digital still cameras, the dynamic range of the image sensor may be inadequate to compensate for an image that has both low light sections and high light sections. In other words, shadows and light are not adequately resolved. Dynamic range is generally defined as the highest possible unsaturated signal divided by the noise floor of the pixel. Thus, dynamic range is related to the signal-to-noise ratio (SNR).

These problems noted above are particularly endemic to CMOS image sensors, which have a lower light sensitivity and narrower dynamic range than charge coupled devices (CCD's).

Prior attempts to solve these problems have included increasing the exposure time using an electronic shutter. However, this method cannot be applied to pinned photodiodes and may result in movement artifacts.

Another method utilizes frame addition using multiple frames that are captured of the same image. However, this technique relies upon one frame for middle and low light levels and another frame for high light levels. This is accomplished using different exposure times for each frame. Nevertheless, it is difficult to add frames that have different exposure times and this degrades picture quality.

Another method uses an image sensor that has pixels with two different fill factors. This type of sensor though has poor resolution for low light level images. Finally, another method uses a high frame driving rate that includes analog-to-digital (ADC) circuit in each pixel. This causes a large pixel size. Further, resolution is limited since movement artifacts may appear.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
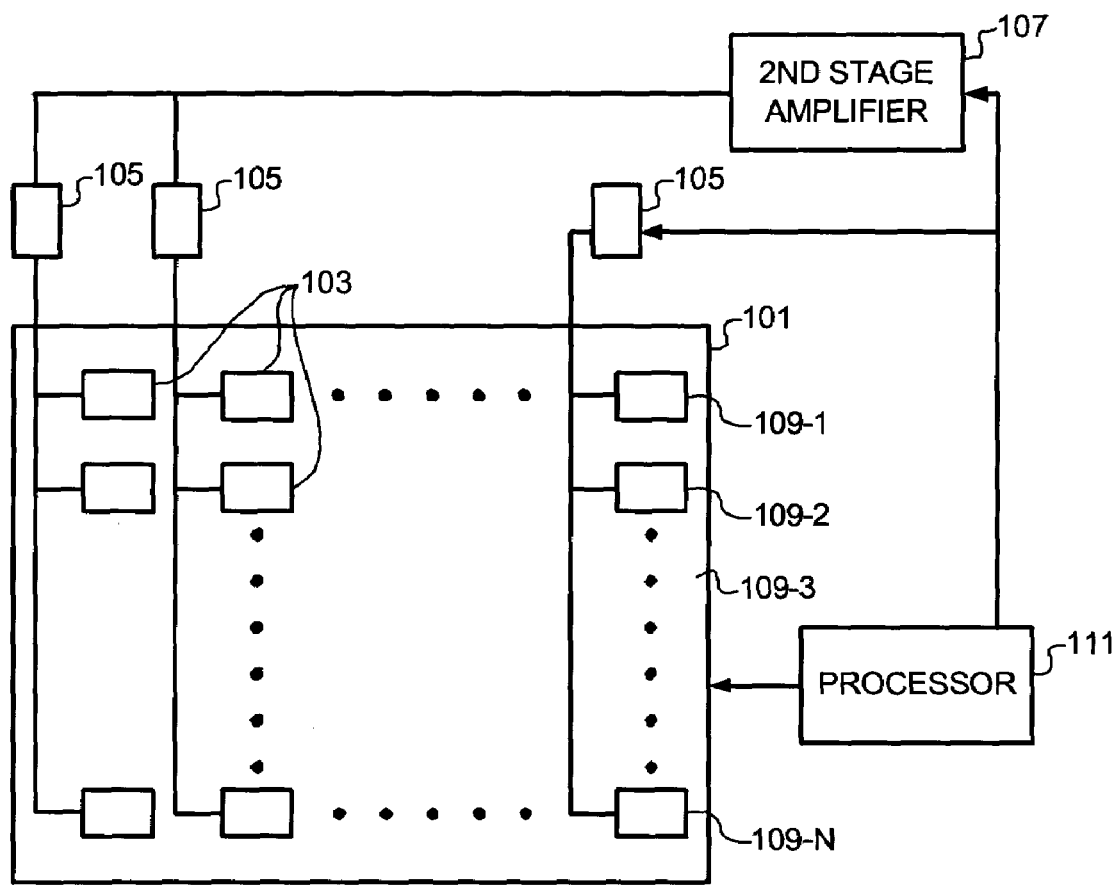
FIG. 1 is a schematic diagram of a CMOS image sensor.

With reference to FIG. 1, an architecture for a CMOS imaging array 101 includes a rectangular matrix of pixels 103. The number of pixels in the horizontal or x-direction, and the number of pixels in the vertical or y-direction, constitutes the resolution of the imaging array 101. Each of the pixels 103 in a vertical column routes its signal to a single charge amplifier 105.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. However, for other applications, different readout protocols may be followed. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be farther processed. In various embodiments, either the column amplifier or the second-stage amplifier may be eliminated. The gain of the column amplifier or the second-stage amplifier may be selectively increased or decreased as the need arises. The readout of the pixels 103, the amplifiers 105 and 107, and the calculations and processes described below may be carried out by processor 111.

As noted above, one important function of the image sensor is to be able to compensate for low light conditions or conditions that include high light and low light sections. An example would be taking an image outdoors in a sunny day, but with the object of the image in a shadow.

The present invention increases dynamic range and minimizes movement artifacts by using a "frame addition" technique. This involves increasing the frame rate of the image sensor and combining (such as by adding) successive frames together to obtain a composite image. As used herein, the term frame is a captured image that is to be used internally by the image sensor for forming a composite image.

As one example, a typical image capture rate is 30 frames per second. This corresponds to a 1/30 second exposure time for each pixel. However, if the frame rate is increased to 120 frames per second, then the exposure time is reduced to 1/120 seconds. This smaller amount of time reduces the amount of movement artifacts present in the image. In fact, objects in the image will typically only move a few pixels during a 1/120 second exposure time. This enables the detection of motion to be done precisely.

Figure 2:
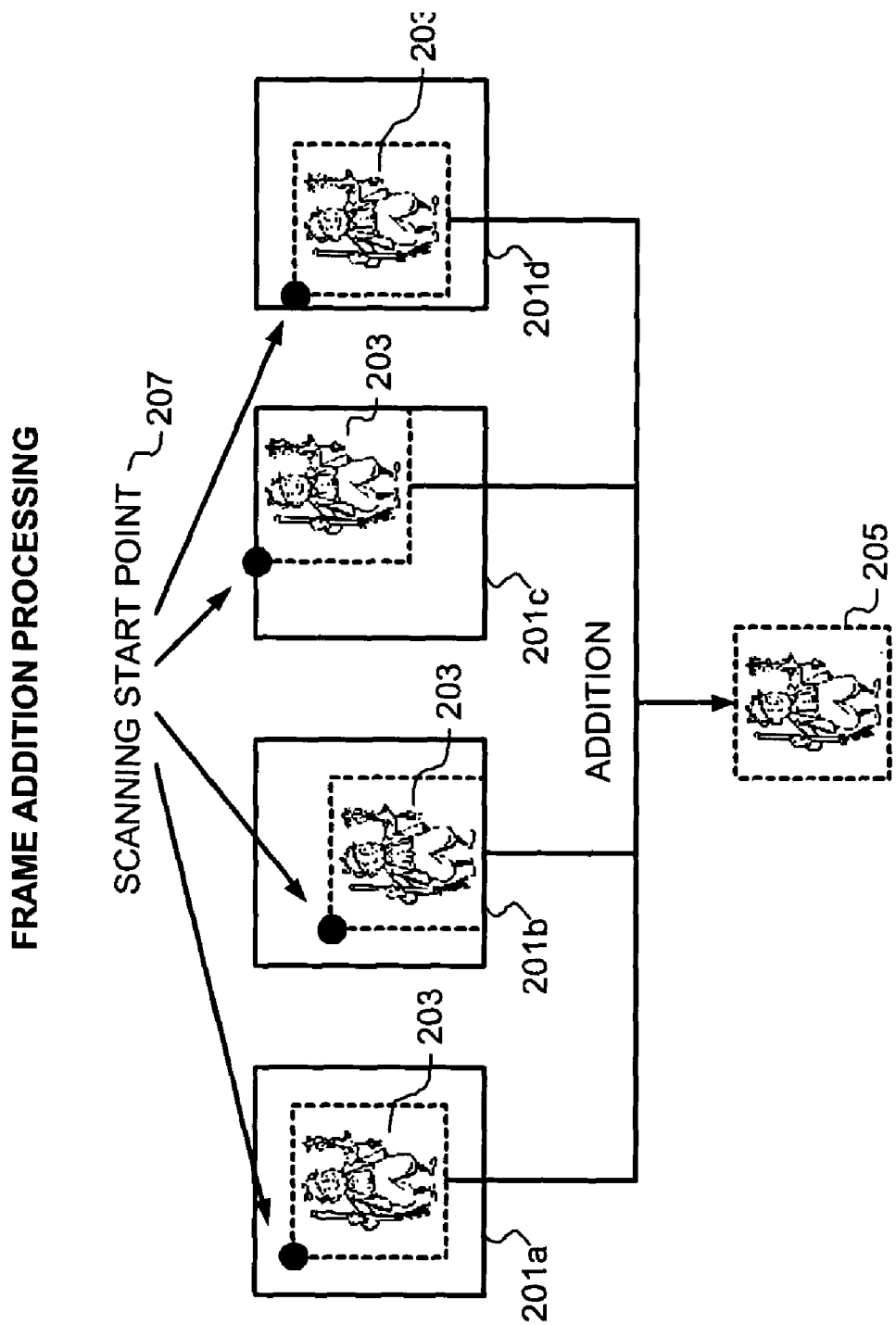
FIG. 2 illustrates four frames taken by the image sensor and used to form the composite image.

As seen in FIG. 2, as one example, four successive frames 201a–d with an object 203 are captured. The frames are captured at a fast exposure time, such as 1/120 seconds. As a result, there is very little blurring of the objects 203 within each individual frame 201a–d (referred to as intraframe movement), even with movement of the objects in the frames. However, as seen in FIG. 2, the objects 203 do move significantly between frames 201a–d (referred to as interframe movement). Thus, as a result of holding instability of the user, the object 203 moves downwardly from frame 201a to 201b. Similarly, the object 203 moves upwardly and to the right from frame 201b to 201c. Finally, the object 203 moves downwardly and to the left from frame 201c to 201d.

As will be detailed below, the four frames 201a–d are used to form a composite image 205 that has a substantially higher signal to noise ratio, and thus, higher dynamic range. In one embodiment, the composite image 205 is formed from a simple mathematical additional of the signals from each of the frames 201a–d. In other embodiments, other mathematical or signal processing techniques may be used to form the composite image 205.

Further, the example described herein utilizes four frames each having a 1/120 second exposure time. However, it can be appreciated that the number of frames used to form the composite image 205 and the exposure time of each frame may be varied, depending upon the application and various design tradeoffs.

Importantly, because of the interframe movement, a reference point is identified for each frame 201a–d. This is also referred to as the scanning start point 207. The scanning start point 207 is used to align each of the frames 201a–d so as to eliminate the effect of interframe movement. The identification of a reference point can be accomplished using any one of a number of techniques, such as the techniques currently used for motion stabilization in video recorders. Alternately, other prior art techniques, such as the use of an accelerometer or the use of motion detection algorithms commonly used in optical mice may be employed.

Figure 3:
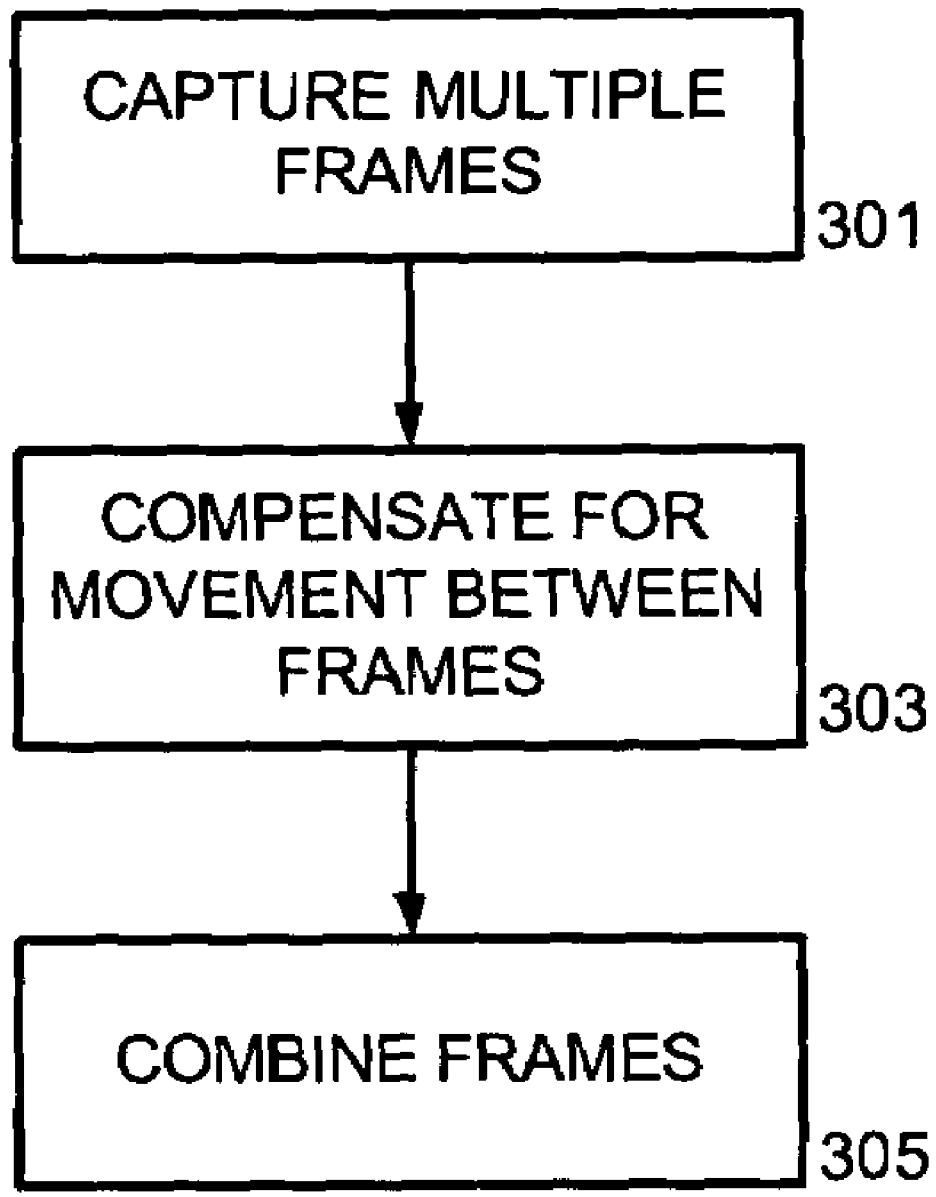
FIG. 3 is a flow diagram of the method of the present invention.

FIG. 3 is a flow diagram showing the method of the present invention. In one embodiment, at box 301, each of the frames 201a–d are captured using the same exposure time. This reduces the difficulty in combining the frames in a coherent manner. However, in some other embodiments, the exposure time may be varied in a known and controlled manner.

Next, at box 303, the frames 201a–d are stored in memory and are analyzed to determine the relative interframe movement. Once this has been done, then the frames are aligned with each other to ensure that the objects 203 of each frame are "atop" each other.

Next, at box 305, the frames 201a–d are combined with one another to form the composite image 205. The combination may be a simple arithmetic addition, or alternatively, some weighted function. The addition can be done by an arithmetic or other type of processor located on the image sensor. It can be appreciated that a multitude of various known prior art software or hardware can be used to implement the combination process.

In an alternatively embodiment, in order to save on memory requirements, the successive frames are added sequentially into memory in an additive manner. For example, the first frame can be stored in a frame memory. The second frame is simply just added into the data stored into the frame memory without the need for separate memory. Of course, the scanning start point 207 should be identified so that the addition of the second frame to the frame memory is aligned with the first frame. The process is repeated with the third and fourth frames.

Figure 4:
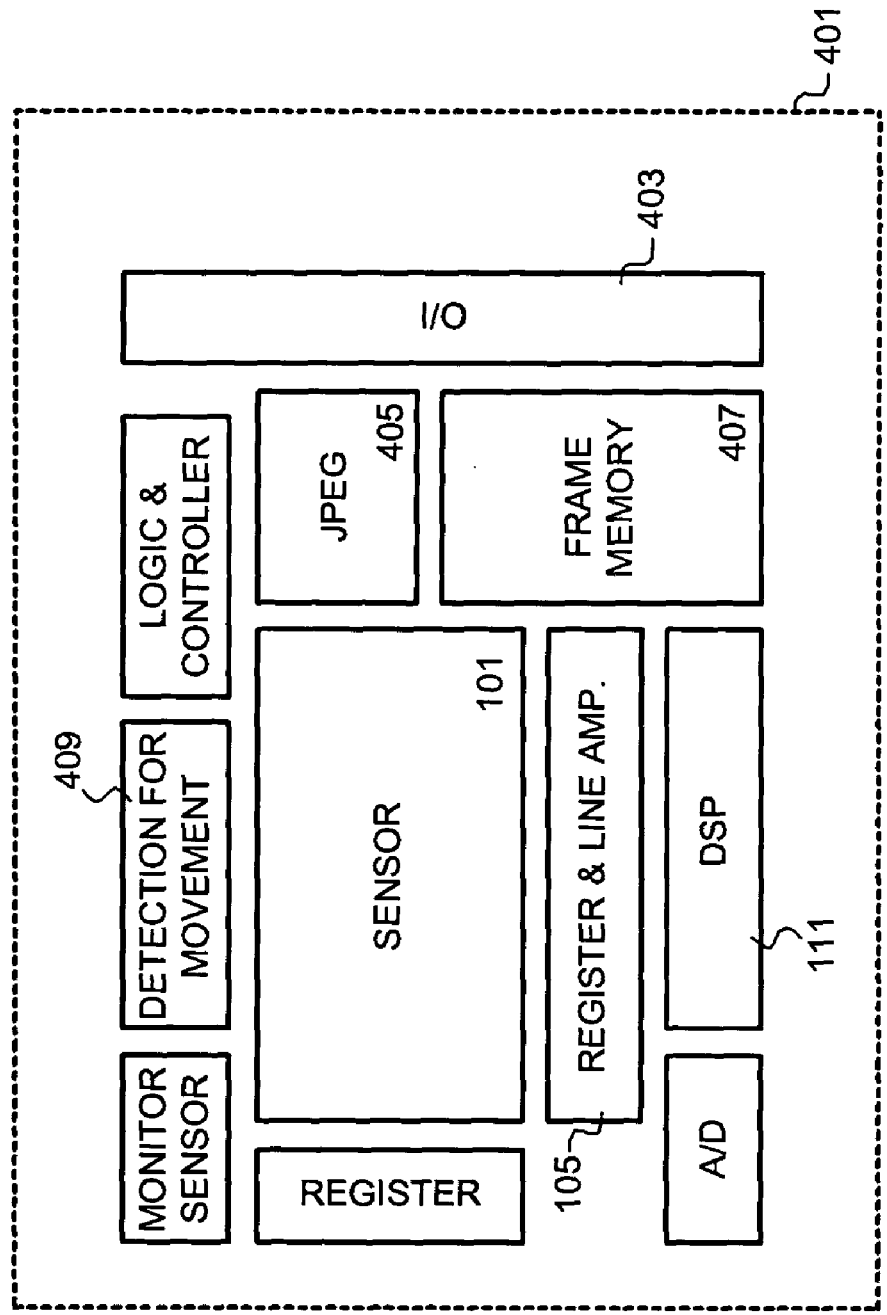
FIG. 4 is a schematic diagram of an image sensor of the present invention.

FIG. 4 is a CMOS image sensor 401 formed in accordance with the present invention. In many respects, the image sensor 401 is substantially similar to the currently available image sensors manufactured by OmniVision Technologies, Inc., the assignee of the present invention. For example, the image sensor includes the imaging array 101, the amplifiers 105, signal processing 111, I/O 403, JPEG compression circuitry 405, and other standard components. However, in accordance with the present invention, the image sensor 401 also includes a frame memory 407 and a movement detector 409. The frame memory 407 is used as an accumulation register that accumulates the signals from the various frames. The movement detector 409 is operative to align the frames 201a–d so that the reference points coincide.

The present invention described above provides a wider dynamic range than prior art techniques. By using a higher frame rate, such as 120 frames per second, this provides a four times increase in dynamic range compared to a frame rate of 30 frames per second. Even if the noise floor of a CMOS image sensor is twice as large as a comparable CCD image sensor, this still results in approximately twice the dynamic range increase.

Furthermore, the present invention compensates for holding instability of digital still cameras and mobile phones. This allows long exposure times and thus operation in low light conditions.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. Thus, the scope of the invention is indicated by the appended claims rather than by the foregoing description, and all changes which come within the meaning and range of equivalency of the claims are intended to be embraced therein.

What is claimed is:

1. A method of forming an image using a CMOS image sensor comprising:
    capturing a plurality of frames using said image sensor, wherein each of said plurality of images are captured using substantially the same exposure time;
    identifying a reference point in each of said plurality of images;
    aligning said plurality of frames using said reference point; and
    combining said plurality of frames into said image.

2. The method of claim 1 wherein said combining is an arithmetic combination of like pixels in said plurality of images.

3. A method of forming a high dynamic range image using a CMOS image sensor comprising:
    capturing a first frame using said image sensor;
    storing said first frame in a frame memory;
    identifying a reference point in said first frame;
    capturing a second frame using said image sensor;
    aligning said second frame to said first using said reference point; and
    adding said second frame to said first frame in said frame memory, wherein said first and second frames are captured using substantially the same exposure time.

4. The method of claim 3 wherein additional frames are captured by said image sensor, aligned using said reference point, and added to said frame memory.

5. The method of claim 3 wherein said adding is an arithmetic combination of like pixels in said first and second frames.

* * * * *